United States Patent
Hsu et al.

(10) Patent No.: US 7,369,529 B2
(45) Date of Patent: May 6, 2008

(54) METHOD AND APPARATUS FOR DIFFERENTIATING POINT TO POINT PROTOCOL SESSION TERMINATION POINTS

(75) Inventors: Raymond T. Hsu, San Diego, CA (US); Nischal Abrol, San Diego, CA (US); Marcello Lioy, San Diego, CA (US)

(73) Assignee: Qualcomm.Incorporated., San Diego, CA (US)

( * ) Notice: Subject to any disclaimer, the term of this patent is extended or adjusted under 35 U.S.C. 154(b) by 864 days.

(21) Appl. No.: 09/865,166

(22) Filed: May 24, 2001

(65) Prior Publication Data

US 2002/0181498 A1 Dec. 5, 2002

(51) Int. Cl.
*H04Q 7/24* (2006.01)
*H04J 3/16* (2006.01)
*H04J 3/22* (2006.01)

(52) U.S. Cl. ...................................... 370/338; 370/469
(58) Field of Classification Search ................ 370/389, 370/392, 464, 466, 469, 397
See application file for complete search history.

(56) References Cited

U.S. PATENT DOCUMENTS

| | | | |
|---|---|---|---|
| 6,400,722 B1 * | 6/2002 | Chuah et al. ................ 370/401 |
| 6,466,985 B1 * | 10/2002 | Goyal et al. ................. 709/238 |
| 6,684,256 B1 * | 1/2004 | Warrier et al. ............... 709/238 |
| 6,728,208 B1 * | 4/2004 | Puuskari ................... 370/230.1 |
| 6,765,909 B1 * | 7/2004 | Sen et al. .................... 370/392 |
| 7,096,261 B2 | 8/2006 | Abrol | |

OTHER PUBLICATIONS

G. McGregor, "The PPP Internet Protocol Control Protocol (IPCP)", Network Working Group: RFC 1332, p. 7.*

* cited by examiner

*Primary Examiner*—Daniel J. Ryman
(74) *Attorney, Agent, or Firm*—Abdollah Katbab; Thomas Rouse

(57) ABSTRACT

A method of supporting multiple PPP instances between a single wireless device and a wireless network using a single IP address and IP stack allows applications to exercise different link characteristics for individual PPP sessions. Routing based on parameters other than IP address, such as QOS parameters, that allow applications to utilize different types of services for same client server endpairs is provided. A PDSN determines whether or not multiple PPP sessions terminate at the same endpoint within a mobile device. A mobile device initiates a subsequent multiple PPP connection by specifying the IP address of an initial connection in the IP Address Configuration Option during IPCP negotiation for the subsequent connection. This address may be obtained from the IPCP phase of the initial PPP connection negotiation using Simple IP, or a Mobile IP Home Address obtained from the Mobile IP registration during establishment of the initial PPP session.

38 Claims, 10 Drawing Sheets

METHOD AND APPARATUS FOR DIFFERENTIATING POINT TO POINT PROTOCOL SESSION TERMINATION POINTS

BACKGROUND

1. Field

The present invention relates to wireless communications. More particularly, the present invention relates to a novel method and apparatus for providing multiple levels of quality of service at a mobile station in a wireless packet data network.

2. Background

The use of code division multiple access (CDMA) modulation techniques is one of several techniques for facilitating communications in which a large number of system users are present. Other multiple access communication system techniques, such as time division multiple access (TDMA), frequency division multiple access (FDMA) and AM modulation schemes such as amplitude companded single sideband (ACSSB) are known in the art. These techniques have been standardized to facilitate interoperation between equipment manufactured by different companies. Code division multiple access communication systems have been standardized in the United States in Telecommunications Industry Association TIA/EIA/IS-95-B, entitled "MOBILE STATION-BASE STATION COMPATIBILITY STANDARD FOR DUAL-MODE WIDEBAND SPREAD SPECTRUM CELLULAR SYSTEMS", and referred to herein as IS-95. In addition, a new standard for CDMA communication systems has been proposed in the United States in Telecommunications Industry Association (TIA), entitled "Upper Layer (Layer 3) Signaling Standard for cdma2000 Spread Spectrum Systems, Release A—Addendum 1", dated Oct. 27, 2000, and referred to herein as "cdma2000."

The International Telecommunications Union recently requested the submission of proposed methods for providing high rate data and high-quality speech services over wireless communication channels. A first of these proposals was issued by the Telecommunications Industry Association, entitled "The IS-2000 ITU-R RTT Candidate Submission." A second of these proposals was issued by the European Telecommunications Standards Institute (ETSI), entitled "The ETSI UMTS Terrestrial Radio Access (UTRA) ITU-R RTT Candidate Submission", also known as "wideband CDMA" and hereinafter referred to as "W-CDMA." A third proposal was submitted by U.S. TG 8/1 entitled "The UWC-136 Candidate Submission", hereinafter referred to as "EDGE." The contents of these submissions is public record and is well known in the art.

IS-95 was originally optimized for transmission of variable-rate voice frames. Subsequent standards have built on the original IS-95 standard to support a variety of additional non-voice services including packet data services. One such set of packet data services was standardized in the United States in Telecommunications Industry Association TIA/EIA/IS-707-A, entitled "Data Service Options for Spread Spectrum Systems", incorporated by reference herein, and hereafter referred to as "IS-707."

IS-707 describes techniques used to provide support for sending Internet Protocol (IP) packets through an IS-95 wireless network. Packets are encapsulated into a featureless byte stream using a protocol called Point-to-Point Protocol (PPP). Using PPP, IP packets can be transported over a wireless network in segments of arbitrary size. The wireless network maintains PPP state information for the duration of the PPP session, or as long additional bytes may be sent in the continuous byte stream between the PPP end points.

Such a continuous byte stream is subsequently encapsulated into a series of IS-95 frames using a protocol called Radio Link Protocol (RLP). RLP includes an error control protocol that uses negative acknowledgments (NAKs) by which the receiver prompts the sender to retransmit lost RLP frames. Because the RLP error control protocol uses retransmissions, RLP data transmission generally exhibits a variable transmission delay from sender to receiver. A modified form of RLP called Synchronous RLP (SRLP), in which no NAKs and no retransmissions are sent by sender or receiver, is well known in the art. The frame error rate in SRLP is greater than that of RLP, but the transmission delay is kept to a minimal constant.

A remote network node such as a personal or laptop computer (PC) connected to a packet-data-capable wireless Mobile Terminal (MT) may access the Internet through a wireless network in accordance with the IS-707 standard. A combined PC and MT is defined herein as a Mobile Station (MS). Alternatively, the remote network node such as a web browser may be built-in to the MT, making the PC optional. A wireless device may comprise any of a number of types of devices including, but not limited to an MT, MS, PC card, personal data assistant (PDA), external or internal modem, or wireless phone or terminal. The wireless device sends data through the wireless network, where the data is processed by a Packet Data Serving Node (PDSN). The PPP state for a connection between a wireless device and the wireless network is typically maintained within the PDSN. The PDSN is connected to an IP network such as the Internet, and transports data between the wireless network and other entities and agents connected to the IP network. In this way, the wireless device can send and receive data to another entity on the IP network through the wireless data connection. The target entity on the IP network is also called a correspondent node. The interaction between a wireless device and the PDSN have been standardized in EIA/TIA/IS-835, entitled "Wireless IP Network Standard," dated June, 2000, and referred to herein as "IS-835." One skilled in the art will recognize that, in some networks, the PDSN is replaced with an Interworking Function (IWF).

IP service is provided to the PPP link layer by an IP service layer. The IS-835 standard defines two methods of IP service for accessing Public and Private networks: Simple IP and Mobile IP. Simple IP is a service in which the user is assigned a dynamic IP address from the local PDSN and is provided routing service by a service provider network. The user retains its IP address as long as it is served by a radio network that has connectivity to the address assigning PDSN. There is no IP address mobility beyond this PDSN. Mobile IP is a service in which the user is provided routing service to a Public IP network and/or secure IP routing service to pre-defined private IP networks. The wireless device is able to use either a non-zero static IP address or a dynamically assigned IP address belonging to its home IP network Home Agent. The wireless device has a non-zero static Home Agent Address assigned regardless of whether the mobile station has a static or dynamic Home Address. The wireless device is able to maintain a persistent IP address even when handing off between radio networks connected to separate PDSNs.

In order to provide more complex wireless network services, there is an increasing desire and need to provide different types of services simultaneously through a single wireless device. Examples include simultaneous voice and packet data services. Examples also include multiple types of packet data services, such as simultaneous web browsing and video conferencing. At the same time, technological advances are increasing the bandwidth available through a single wireless channel between a wireless device and the wireless network.

However, modern networks are not yet capable of supporting simultaneous packet data services having substantially different grades of service through a single wireless channel. For example, delay sensitive applications like video conferencing and voice over IP are optimally sent without RLP retransmissions in order to reduce the magnitude and variability of packet delay through the network. On the other hand, applications such as FTP, e-mail, and web browsing are less delay-sensitive, so are optimally sent using RLP retransmissions. Current wireless standards adequately support a wireless application that requires any one of several grades of service, known as a Quality of Service (QOS), in a single wireless device. Current standards cannot, however, support multiple QOSs in a single wireless device. Multiple QOSs in a single wireless device are required for the use of multiple applications where each application requires a different QOS, and by single applications that use multiple QOSs for differing levels of RLP transmission delay sensitivity. Multiple QOSs are not currently supported in a single wireless device because each QOS would require its own specifically configured PPP connection including an IP address and IP stack. Multiple IP stacks operating in a single wireless device cause IP address confusion that produces difficulty in the routing of IP packets to their proper PPP termination points by the PDSN. Thus, there is a need in the art for a way of supporting multiple PPP connections in a single wireless device, where the PDSN is able to differentiate individual PPP session termination points operating under one IP stack within a wireless device.

SUMMARY

Embodiments disclosed herein address the above-stated needs by providing the PDSN with the capability of differentiating PPP session termination points within a wireless device that supports multiple PPP sessions associated with a single IP address.

Accordingly, in one aspect of a wireless communication system, a method for utilizing a single Internet Protocol address for multiple Point-to-Point Protocol instances between a single wireless device and a wireless network includes establishing a first Point-to-Point Protocol link having an Internet Protocol Address, establishing a second Point-to-Point Protocol link having the same Internet Protocol Address as the first Point-to-Point Protocol link, and differentiating the endpoints of the first Point-to-Point Protocol link and the second Point-to-Point Protocol link using a link characteristic.

An another aspect of a wireless communication system, a method for differentiating Point-to-Point Protocol session termination endpoints within a wireless device that supports multiple Point-to-Point Protocol sessions associated with a single Internet Protocol Address includes establishing an initial Point-to-Point Protocol session between the wireless device and a wireless network node having an Internet Protocol address, initiating a subsequent Point-to-Point Protocol session, between the wireless device and the wireless network node, using an Internet Protocol Control Protocol Configuration-Request message requesting the Internet Protocol Address of the initial Point-to-Point Protocol session in an Address Configuration Option of the message, issued from the wireless device to the wireless network node, searching for and finding, by the wireless network node, the initial Point-to-Point Protocol session with an Internet Protocol Address matching the requested Internet Protocol Address of the subsequent Point-to-Point Protocol session and a Mobile Station Identifier matching the Mobile Station Identifier of the wireless device, concluding, by the wireless network node, that the subsequent Point-to-Point Protocol session is a multiple Point-to-Point Protocol session event, accepting, by the wireless network node, the requested Internet Protocol address for the subsequent Point-to-Point Protocol session and acknowledging the acceptance in an Internet Protocol Control Protocol Configuration-Acknowledgement message returned to the wireless device having the requested Internet Protocol Address in the Address Configuration Option of the Configuration-Acknowledgement message, allowing, by the wireless network node, the exchange of data packets with the wireless device, and differentiating the endpoints of the initial Point-to-Point Protocol session and the subsequent Point-to-Point Protocol session using a session link characteristic.

In another aspect of a wireless communication system, a method for providing multiple grades of Radio Link Protocol service to an application of a wireless device includes establishing a Point-to-Point Protocol session for each grade of Radio Link Protocol service used by the application to create a set of Point-to-Point Protocol sessions, where each Point-to-Point Protocol session belonging to the set has the same Internet Protocol address, and differentiating the endpoint of each Point-to-Point Protocol sessions in the set using a session link characteristic.

In yet another aspect of a wireless communication system, a method for providing at least one grade of Radio Link Protocol service to a first application, and at least one grade of Radio Link Protocol service to at least a second application of a wireless device includes establishing at least one Point-to-Point Protocol session for the at least one grade of Radio Link Protocol service used by the first application, and establishing at least one Point-to-Point Protocol session for the at least one grade of Radio Link Protocol service used by the at least second application, wherein each of the Point-to-Point Protocol sessions has the same Internet Protocol Address, and differentiating the endpoint of each Point-to-Point Protocol session using a session link characteristic.

In another aspect, a wireless communication system includes a wireless device for supporting multiple Point-to-Point Protocol sessions having an identical Internet Protocol Address and different link characteristics, and a wireless network node for exchanging data packets with the wireless device by differentiating the endpoint of each of the multiple Point-to-Point Protocol sessions using a session link characteristic.

The word "exemplary" is used throughout this application to mean "serving as an example, instance, or illustration." Any embodiment described as an "exemplary embodiment" is not to be construed as necessarily preferred or advantageous over other embodiments described herein.

DETAILED DESCRIPTION

Figure 1:
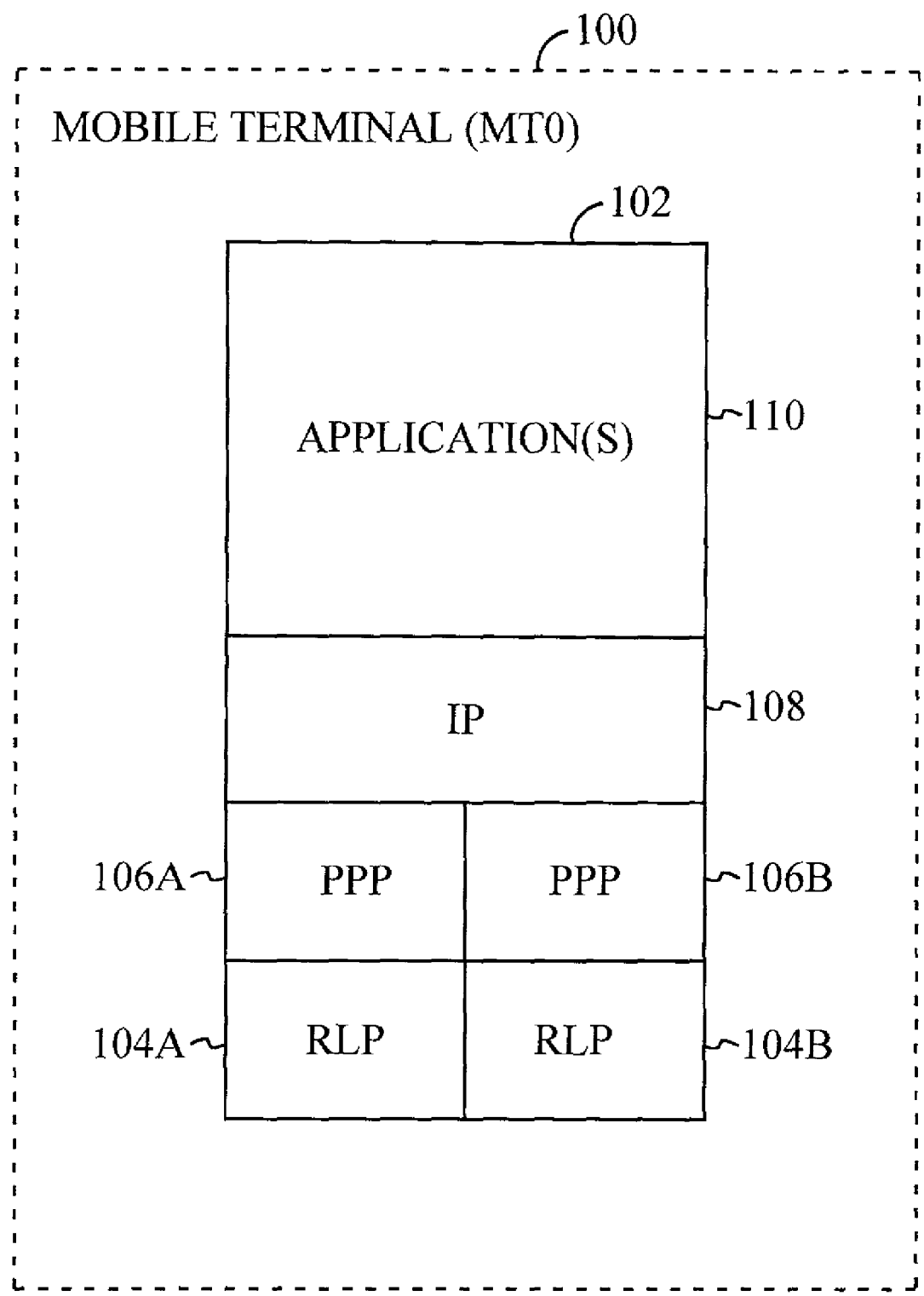
FIG. 1 illustrates an exemplary embodiment of a single-device mobile termination in accordance with an exemplary embodiment.

Multiple applications using different grades of service, or single applications using multiple grades of service, could be supported on a single wireless device using a separate PPP stack for each application. However, supporting multiple PPP instances for a single wireless device would needlessly consume large amounts of data memory in both the wireless device and the PDSN.

In addition, if a Radio Link Protocol (RLP) session were established for use by an application that required low latency, the RLP should be configured to operate without retransmissions. While this would result in the low latency that is best for the overlying application, the Link Control Protocol (LCP), the IP Control Protocol (IPCP), and other configuration protocols that are required to establish the PPP link would have to proceed without error control. The resulting increase in frame error rate could cause delays or even failure of PPP configuration before any application packets could be sent. Providing multiple byte streams to one of a multiple of RLP connections having different retransmission and delay properties, or link characteristics, is described in co-pending application Ser. No. 09/823,475, filed Mar. 12, 2001, entitled "Method and Apparatus for Providing Multiple Quality of Service Levels in a Wireless Packet Data Services Connection."

Furthermore, supporting multiple PPP instances in a single wireless device would make routing difficult if the network peer cannot recognize multiple IP addresses for a single application. More time is required to set up the connections, and IP addresses are not conserved.

The disclosed embodiments utilize a single IP address and IP stack for multiple PPP instances between a wireless device and the wireless network. The disclosed embodiments allow applications to exercise different link characteristics for individual PPP sessions, and provide routing based on parameters other than IP address, such as QOS parameters, that allow applications to utilize different types of services for same client server endpairs.

The disclosed embodiments allow a PDSN to determine whether or not multiple PPP sessions terminate at the same endpoint within a wireless device. If the wireless device initiates a succeeding PPP connection and wants to use the same IP address and IP stack as an initial PPP connection, the wireless device specifies the IP address of the initial connection in the IP Address Configuration Option during IPCP negotiation for the subsequent connection. This address may be a Simple IP address obtained from the IPCP phase of the first PPP or this address may be a Mobile IP home address obtained from the Mobile IP registration during the establishment of the initial PPP session.

When the PDSN receives the IP Address Configuration Option indicating a non-zero address, the PDSN checks whether or not the IP address and the MSID associated with this newly requested succeeding PPP connection matches the IP address and MSID of any existing PPP connections. The PDSN uses the MSID to identify which wireless device originated the PPP connection, and then uses the IP Address Configuration Option to differentiate the end-point within the wireless device. If the IP address and the MSID associated with the succeeding PPP connection match with an existing PPP connection, both PPP connections will have the same IP address, and the PDSN will allow data flow on the succeeding PPP connection immediately after its establishment. It is not necessary for the PDSN to perform service differentiation on the second PPP, because the service type (Simple IP or Mobile IP) on the succeeding PPP connection is the same as the service type of the first PPP connection. There is no need for the PDSN to authenticate the Simple IP or Mobile IP services on the succeeding PPP connection because although an IP address might be fraudulently assumed in the succeeding PPP connection IPCP negotiation, it is not possible to fraudulently assume an MSID during the over-the-air access authentication. This means that an impersonator would not be able to establish a PPP connection that associates with both the IP address and MSID of the initial PPP connection. Thus, authentication is not required during negotiation for a succeeding PPP connection with Simple IP, even though authentication may have been performed during LCP negotiation of the initial PPP connection. Similarly, Mobile IP re-registration is not required after the establishment of the initial PPP connection.

If the IP address and/or MSID associated with the requested succeeding PPP connection do not match with any existing PPP connection, the PDSN performs service differentiation between Simple IP and Mobile IP, and then enforces necessary authentication mechanisms. The PDSN performs the service differentiation by sending Agent Advertisements to the wireless device when the PDSN receives an IP Address Configuration Option indicating a non-zero address. If the first packet received from the wireless device is not a Mobile IP Registration Request or Agent Solicitation, the PDSN concludes that the wireless device is using Simple IP and restarts the PPP connection to perform authentication if enabled by the operator, and assign a new IP address to the wireless device.

A remote network node such as a personal or laptop computer (PC) connected to a packet-data-capable MT may access the Internet through a wireless network in accordance with the IS-707 standard. This configuration is known as a multiple-device termination. Alternatively, the remote network node such as a web browser may be built-in to the MT, making the PC optional. This configuration is known as a single-device termination.

FIG. 1 illustrates a single-device mobile termination configuration 100 in accordance with an exemplary embodiment. The single-device mobile termination configuration 100 illustrated in FIG. 1 is also known as a Mobile Termination 0 (MT0). In a single-device termination configuration 100, all the software layers 102 (RLP 104, PPP 106, IP 108, and Application 110) are running on the MT0. RLP layer 104a provides a continuous byte stream of IP packet data to PPP session 106a. Likewise, RLP layer 104b provides a continuous byte stream of IP packet data to PPP session 106b. RLP layer 104a and RLP layer 104b may have different link characteristics with different retransmission and delay properties. One skilled in the art would understand that multiple PPP sessions 106a and 106b could also be provided with byte streams from a single RLP layer, and that many permutations of instances and combinations of RLP 104 and PPP 106 layer configurations are possible. The IP packets may be routed by the IP stack 108 based on the QOS. In a single-device termination configuration, the PDSN (not shown) does not assign different IP addresses to the PPP sessions 106. Single-device mobile termination configuration 100 may use Simple IP or Mobile IP service.

Figure 2:
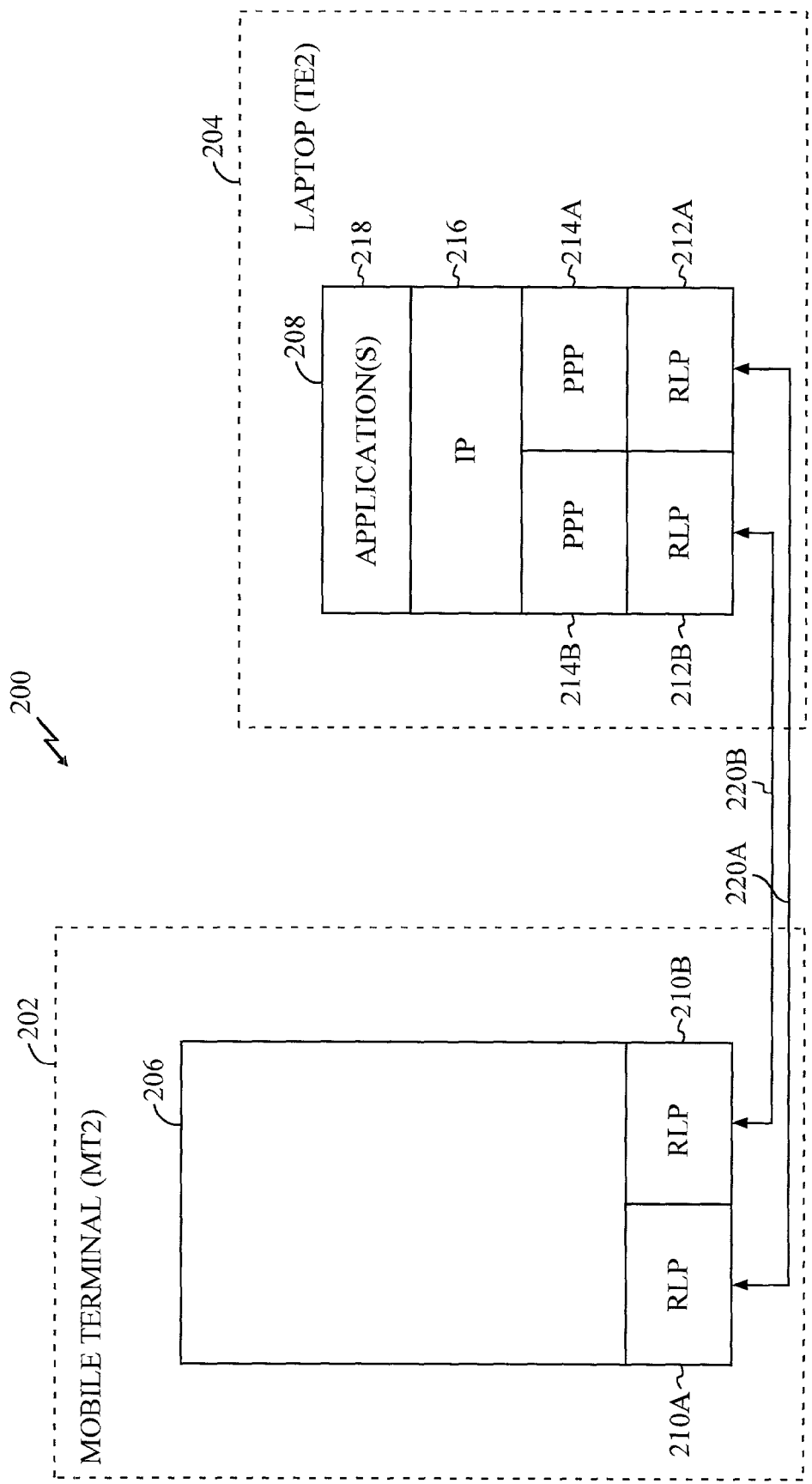
FIG. 2 illustrates an exemplary embodiment of a multiple-device mobile termination in accordance with an exemplary embodiment.

FIG. 2 illustrates a multiple-device mobile termination configuration 200 in accordance with an exemplary embodiment. The exemplary multiple-device mobile termination configuration 200 illustrated in FIG. 2 is also known as a relay model, or MS. The relay model 200 illustrated comprises a Mobile Termination 2 (MT2), and a laptop computer 204, or Termination Equipment (TE2). A wireless internet connection is provided to the laptop 204 through the MT2 202. The RLP layer 212 of the laptop 204 interfaces the RLP layer 210 of the MT2 202 through a Universal Asynchronous Receiver/Transmitter (UART) supporting Universal Serial Bus (USB), Bluetooth, Shared Memory, or any other serial or parallel connection 220. In a multiple-device termination configuration 200, all the software layers 208 (RLP 212, PPP 214, IP 216 and Application 218) are running on the Laptop (TE2) 204, while the MT 202, operates software layers 206 necessary for providing a wireless internet connection to the laptop 204. RLP layer 212a of the laptop 204 provides a continuous byte stream of IP packet data received from MT2 RLP layer 210a to PPP session 214a. Likewise, RLP layer 212b of the laptop 204 provides a continuous byte stream of IP packet data received from MT2 RLP layer 210b to PPP session 214b. RLP layer 212a and RLP layer 212b may have different link characteristics with different retransmission and delay properties. One skilled in the an would understand that multiple PPP sessions 214a and 214b could also be provided with byte streams from a single RLP layer, and that many permutations of instances and combinations of RLP 212 and PPP 214 layer configurations are possible. One skilled in the art would also understand that many configurations of alternative MT2 devices and TE2 devices are possible without departing from the scope of the disclosed embodiments. The IP packets may be routed by the IP stack 216 based on the QOS. In a multiple-device termination configuration, the PDSN or other network entity (not shown) does not assign different IP addresses to the PPP sessions 214 if the multiple PPP sessions are for the same device. If the multiple PPP sessions are for different devices (for example, one PPP session for the MT2 and one PPP session for the TE2), the PPP sessions are assigned different addresses by the PDSN or other network entity (not shown). Multiple-device mobile termination configuration 200 may use Simple IP or Mobile IP services.

PPP link establishment and configuration for multiple PPP sessions in a single wireless device are detailed in FIG. 3-FIG. 8. The PPP protocol provides a standard method of encapsulating Network Layer protocol information over point-to-point links. PPP also defines an extensible Link Control Protocol (LCP), and proposes a family of Network Control Protocols (NCPs) for establishing and configuring network-layer protocols, including IP Control Protocol (IPCP), to provide a standard method for transporting multi-protocol datagrams over point-to-point links. In other words, PPP comprises three main components including a method for encapsulating multi-protocol datagrams, a Link Control Protocol for establishing, configuring, and testing the data-link connection, and a family of Network Control Protocols (NCPS) for establishing and configuring different network-layer protocols. The Point-to-Point Protocol is designed for simple links which transport packets between two peers. These links provide full-duplex simultaneous bi-directional operation, and are assumed to deliver packets in order. PPP provides a common solution for easy connection of a wide variety of hosts, bridges and routers.

In order to be sufficiently versatile and to be portable to a wide variety of environments, PPP provides a Link Control Protocol. The LCP is used to automatically agree upon the encapsulation format options, handle varying limits on sizes of packets, detect a looped-back link and other common mis-configuration errors, and terminate the link. Other optional facilities provided by LCP are authentication of the identity of a PPP session peer on the link, and determination of when a link is functioning properly and when a link is failing.

PPP link configuration using LCP is intended to be simple and straightforward. By design, the standard defaults handle all common configurations. An implementor can specify improvements to the default configuration, which are automatically communicated to the peer without operator intervention. Finally, the operator may explicitly configure options for the link that enable the link to operate in environments where it would otherwise be impossible. This self-configuration is implemented through an extensible option negotiation mechanism, wherein each end of the link describes to the other its capabilities and requirements. Although the option negotiation mechanism is specified in terms of the LCP, the same facilities are designed to be used by other control protocols, especially the family of NCPs including IPCP.

PPP uses four messages to negotiate parameters for almost all protocols. These messages are called Configure-Request (Conf-Req), Configure-Acknowledge (Conf-Ack), Configure-Negative-Acknowledge (Configure-Nak (Conf-Nak)), and Configure-Reject (Conf-Rej). Each message contains within it a list of options and parameters. In order to establish communications over a point-to-point link, each end of the PPP link first sends LCP packets to configure and test the data link during an LCP phase, followed by an IPCP phase in which IP address and header compression are established for the PPP session. After the link has been established, the peer may be authenticated. Then, PPP sends IPCP packets to choose and configure one or more network-layer protocols. Once each of the chosen network-layer protocols has been configured, datagrams (IP packets) from each network-layer protocol can be exchanged over the link. The link will remain configured for communications until explicit LCP or IPCP packets close the link down, or until some external event occurs (an inactivity timer expires or network administrator intervention, etc.). Thus, the LCP and the IPCP are used to establish and configure a PPP connection.

Figure 3:
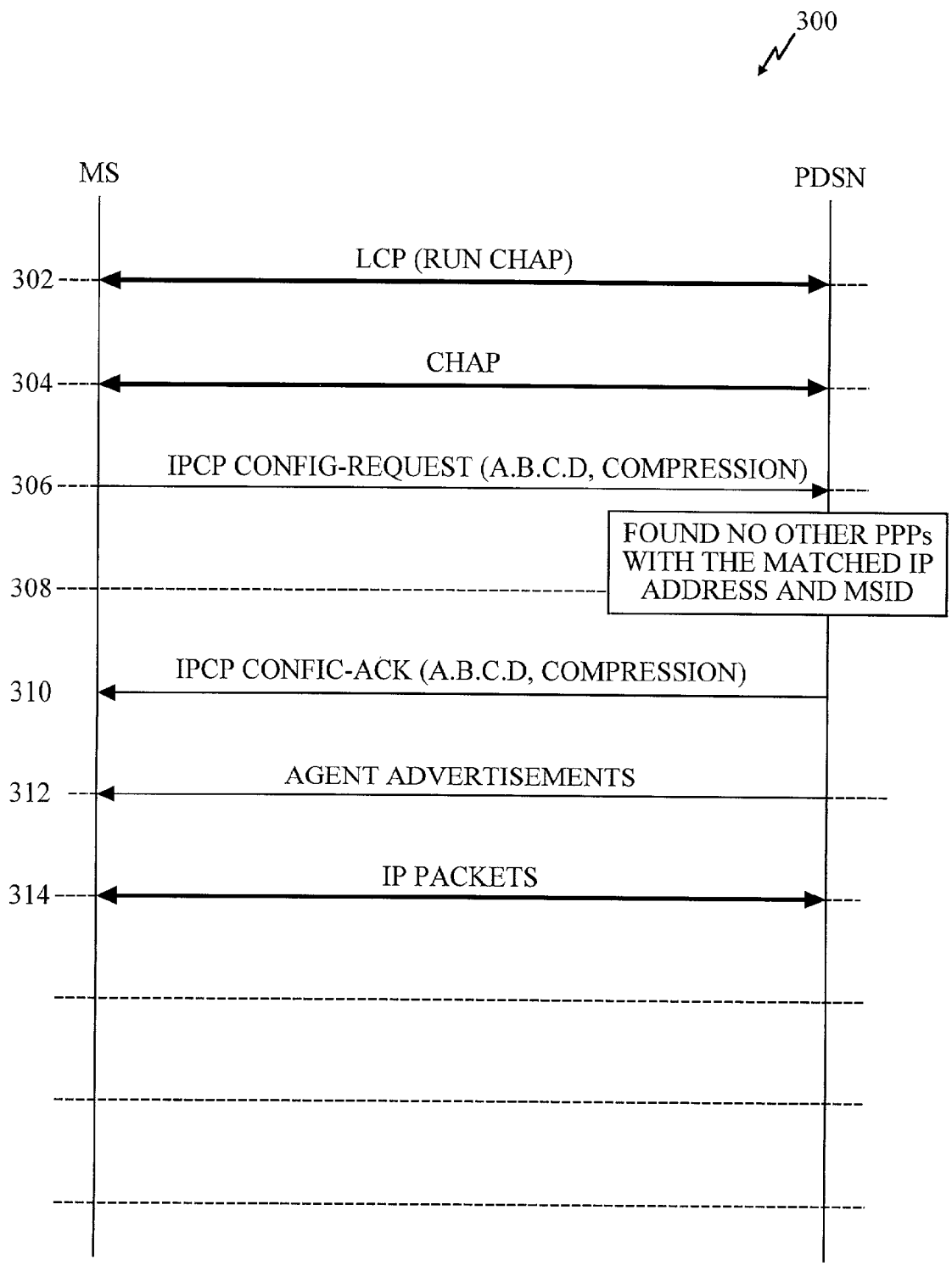
FIG. 3 illustrates the message flow between a Mobile Station using Simple IP service and a PDSN for establishing an initial PPP connection, in accordance with an exemplary embodiment.

FIG. 3 illustrates the message flow 300 between a Mobile Station using Simple IP service and a PDSN for establishing an initial PPP connection, in accordance with an exemplary embodiment.

In LCP message exchange 302, the wireless device requests an initial PPP connection. For an initial request in Simple IP, the PDSN requires the wireless device to authenticate itself before allowing network-layer protocol packets to be exchanged by requesting the use of Challenge Handshake Authentication Protocol (CHAP). One skilled in the art would understand that the use of Password Authentication Protocol (PAP) could also be requested.

In LCP message exchange 304, the wireless device agrees to CHAP and the network authenticates the wireless device. The wireless device then requests a non-zero IP address (or assigns and address) for the connection by sending an IPCP Config-Req message 306 specifying a unique address in the IP Address Configuration Option and a Boolean indication for header compression in the IP Compression Protocol Option. One skilled in the art would also understand that for an initial connection, the wireless device may alternately specify zero in the IP Address Configuration Option to request that the network assign an IP address for the initial PPP session. The PDSN searches 308 for existing PPP connections with a matching IP address and Mobile Station Identifier (MSID). Finding no matching connections, the PDSN accepts the requested IP address and compression indicator by sending a Config-Ack message 310 to the wireless device specifying the requested (or assigned)address in the Address Configuration Option and the indicator in the IP Compression Protocol Option Option. Since the IP address and MSID associated with this PPP connection do not match any other existing PPP connections, the PDSN concludes that this PPP connection is not a multiple PPP event.

The PDSN may optionally perform Agent Advertisement 312. IP packet exchange is then allowed 314 between the wireless device and the PDSN.

One skilled in the art will understand that ordering of messages illustrated in FIG. 3 is not limiting. The message flow is readily amended by the addition of messages, or the omission or re-ordering of the messages illustrated without departing from the scope of the disclosed embodiments.

Figure 4:
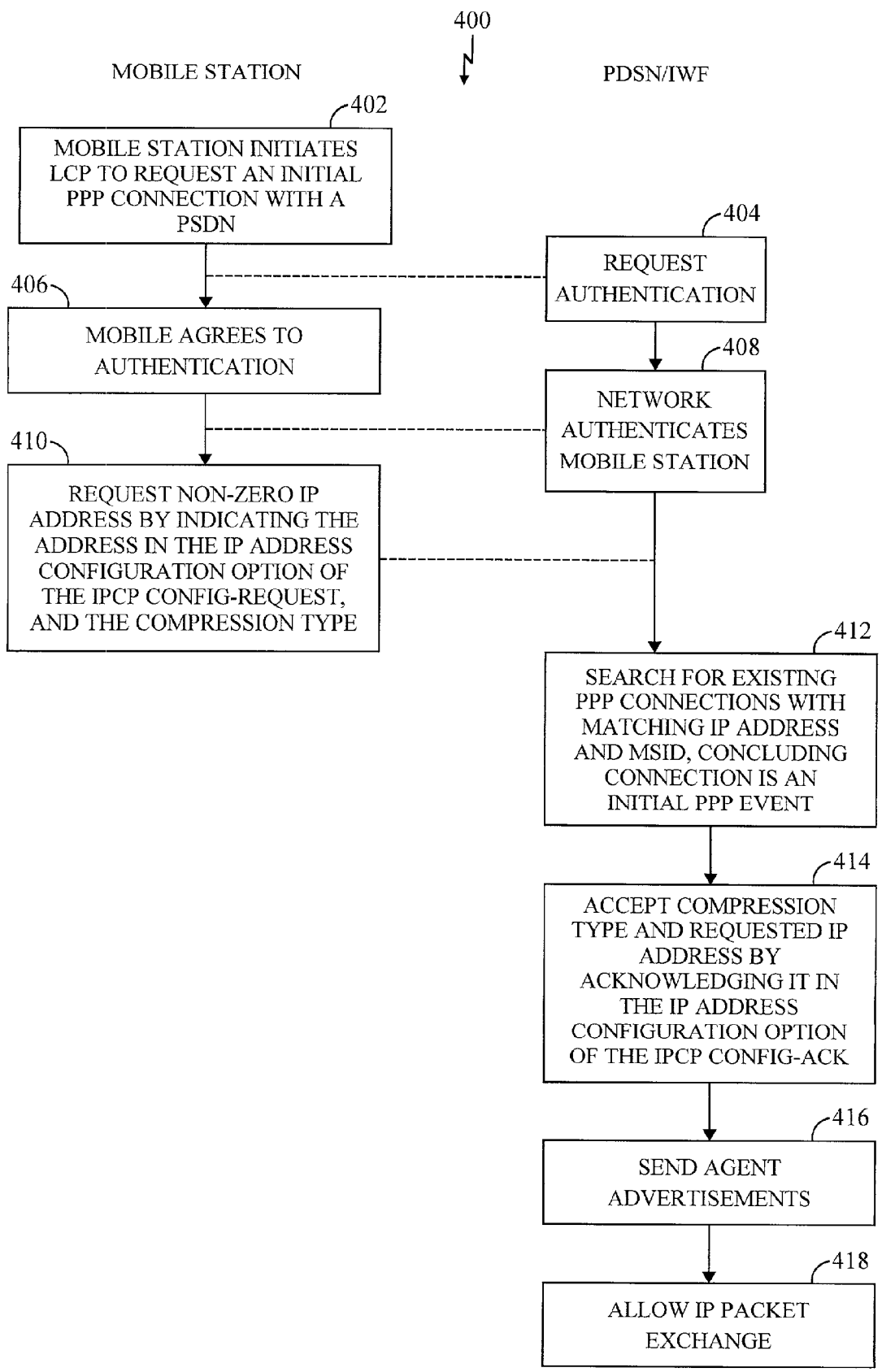
FIG. 4 is a flowchart illustrating steps of establishing an initial PPP connection between a Mobile Station using Simple IP service and a PDSN, in accordance with an exemplary embodiment.

FIG. 4 is a flowchart 400 illustrating steps of establishing an initial PPP connection between a wireless device using Simple IP service and a PDSN, in accordance with an exemplary embodiment.

Establishment of an initial PPP connection between a wireless device using Simple IP service and a PDSN begins in step 402 with a request from the wireless device to the PDSN for an initial PPP connection. Control flow proceeds to step 404.

In step 404, the PDSN requests authentication from the wireless device. The PDSN may request CHAP or PAP authentication. Control flow proceeds to step 406.

In step 406, the wireless device agrees to authentication by the network. Alternately the wireless device may specify a different preferred authentication protocol. Control flow proceeds to step 408.

In step 408, the PDSN authenticates the wireless device. Control flow proceeds to step 410.

In step 410, the wireless device requests a non-zero IP address for the connection by sending an IPCP Config-Req message to the PDSN specifying a non-zero address in the IP Address Configuration Option and a Boolean indication for header compression in the IP Compression Protocol Option Option. In a request for an initial connection, the wireless device may alternately specify zero in the IP Address Configuration Option to request that the network assign an IP address for the initial PPP session. Control flow proceeds to step 412.

In step 412, the PDSN searches for existing PPP connections with a matching IP address and MSID. Since the IP address and MSID associated with this initial PPP connection will not match any other existing PPP connections, the PDSN concludes that this PPP connection is not a multiple PPP event. Control flow proceeds to step 414.

In step 414, the PDSN accepts the IP address and compression indicator requested by the wireless device by sending a Config-Ack message to the wireless device specifying the requested address in the IP Address Configuration Option and the indicator in the IP Compression Protocol Option Option. Control flow proceeds to step 416.

In step 416, the PDSN optionally sends Agent Advertisements. Control flow proceeds to step 418.

In step 418, the link has been established, and the network layer protocols have been configured for communications. Packets are transported between the wireless device and the PDSN on the link until the link is closed.

One skilled in the art will understand that ordering of steps illustrated in FIG. 4 is not limiting. The method is readily amended by the addition of steps, or the omission or re-ordering of the steps illustrated without departing from the scope of the disclosed embodiments.

Figure 5:
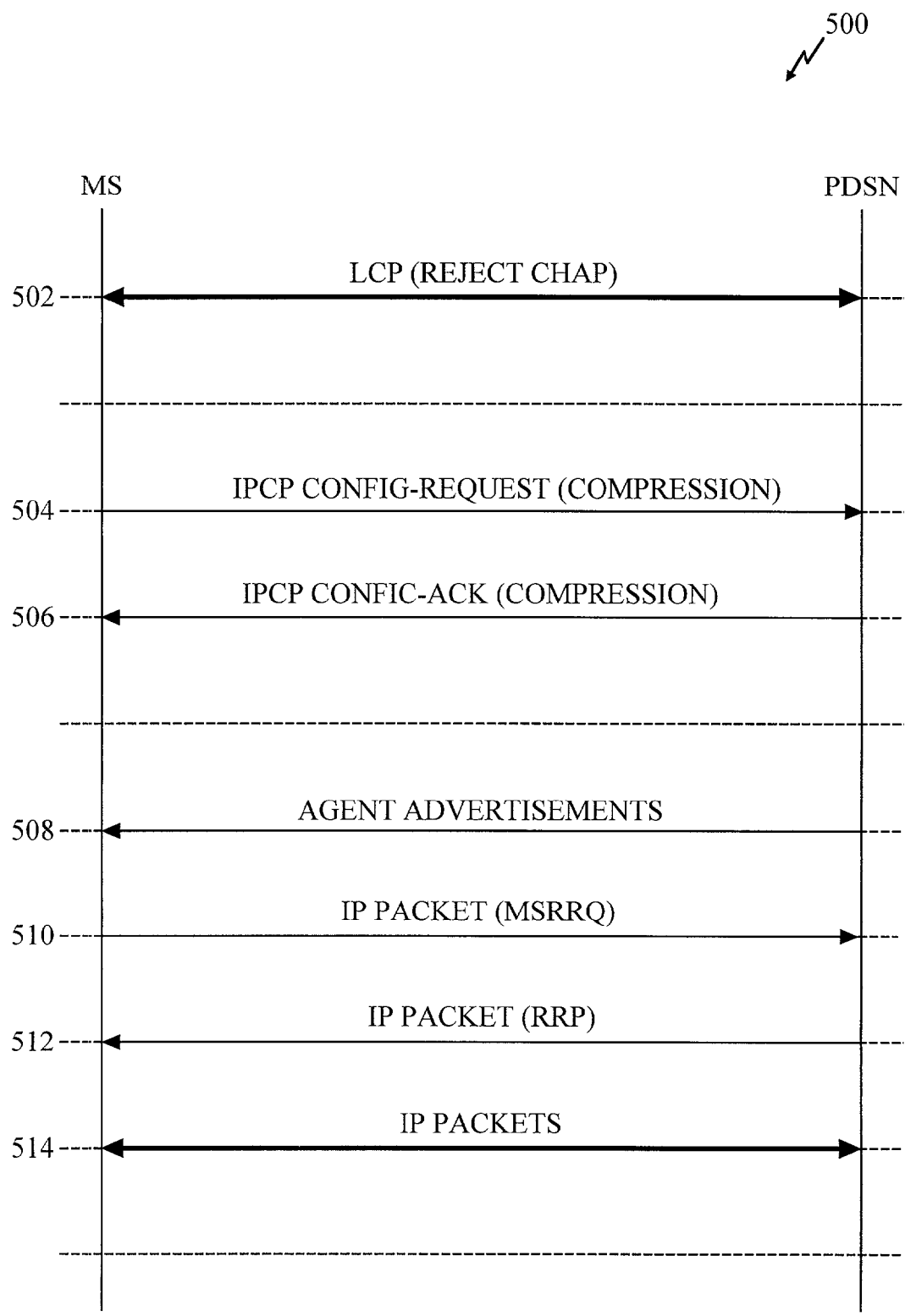
FIG. 5 illustrates the message flow between a Mobile Station using Mobile IP service and a PDSN for establishing an initial PPP connection, in accordance with an exemplary embodiment.

FIG. 5 illustrates the message flow 500 between a wireless device using Mobile IP service and a PDSN for establishing an initial PPP connection, in accordance with an exemplary embodiment. For an initial request in Mobile IP, the wireless device is not required to authenticate itself before network-layer protocol packets can be exchanged. In Mobile IP, the authentication has already been performed during Mobile IP service negotiation. There is no need to repeat authentication when establishing an initial PPP connection in Mobile IP.

In LCP message exchange 502, the wireless device rejects authentication in negotiation for an initial PPP connection.

The wireless device then sends an IPCP Config-Req message 504, specifying a boolean indication for header compression in the IP Compression Protocol Option Option. The PDSN accepts the requested compression indicator by sending a Config-Ack message 506 to the wireless device acknowledging the requested compression indicator in the IP Compression Protocol Option Option. The PDSN may optionally perform Agent Advertisement 508.

The wireless device then sends the PDSN a Mobile Station Registration Request message 510. A Home Agent generates a Registration Reply with an IP address for the initial PPP connection. The PDSN forwards the Registration Reply 512 containing the IP address for the initial PPP connection from the Home Agent to the wireless device.

IP packet exchange is then allowed 514 between the wireless device and the PDSN.

One skilled in the art will understand that ordering of messages illustrated in FIG. 5 is not limiting. The message flow is readily amended by the addition of messages, or the omission or re-ordering of the messages illustrated without departing from the scope of the disclosed embodiments.

Figure 6:
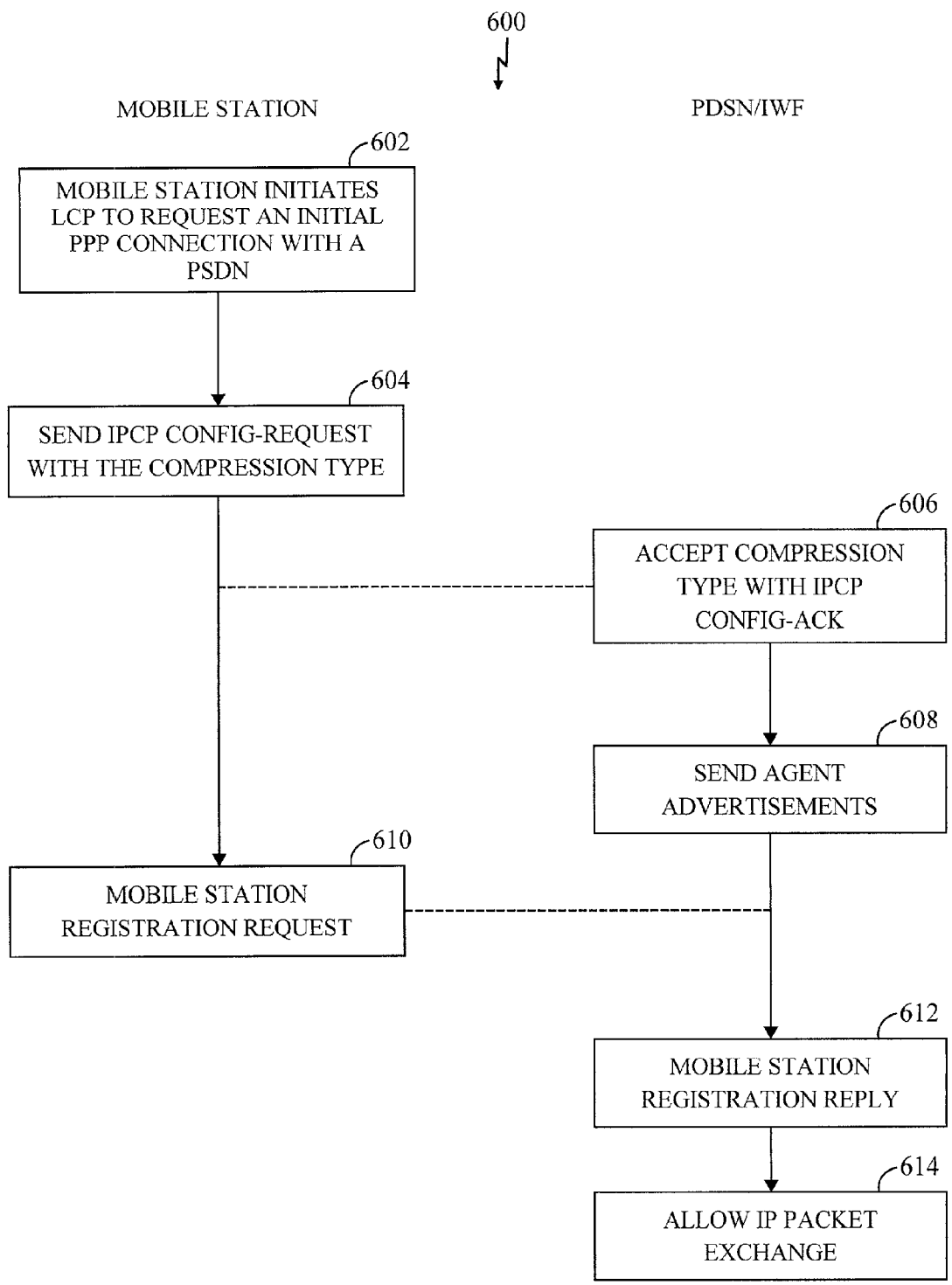
FIG. 6 is a flowchart illustrating steps of establishing an initial PPP connection between a Mobile Station using Mobile IP service and a PDSN, in accordance with an exemplary embodiment.

FIG. 6 is a flowchart illustrating steps of establishing an initial PPP connection between a wireless device using Mobile IP service and a PDSN, in accordance with an exemplary embodiment. Establishment of an initial PPP connection between a wireless device using Mobile IP service and a PDSN begins in step 602 with a request from the wireless device to the PDSN for an initial PPP connection. Control flow proceeds to step 604.

In step 604, the wireless device requests a header compression type for the connection by sending an IPCP Config-Req message to the PDSN specifying a Boolean indication for header compression in the IP COMPRESSION PROTOCL Option. Control flow proceeds to step 606.

In step 606, the PDSN accepts the compression indicator requested by the wireless device by sending a Config-Ack message to the wireless device acknowledging the requested header compression indicator in the IP COMPRESSION PROTOCL Option. Control flow proceeds to step 608.

In optional step 608, the PDSN sends Agent Advertisements. Control flow proceeds to step 610.

In step 610, the wireless device requests Mobile Station Registration. Control flow proceeds to step 612.

In step 612, the PDSN forwards a Registration Reply containing an IP address for the initial PPP connection generated by a Home Agent to the wireless device. Control flow proceeds to step 614.

In step 614, the PPP link has been established, and the network layer protocols have been configured for communications. Packets are transported between the wireless device and the PDSN on the link until the link is closed.

One skilled in the art would understand that ordering of steps illustrated in FIG. 6 is not limiting. The method is readily amended by the addition of steps, or the omission or re-ordering of the steps illustrated without departing from the scope of the disclosed embodiments.

Figure 7:
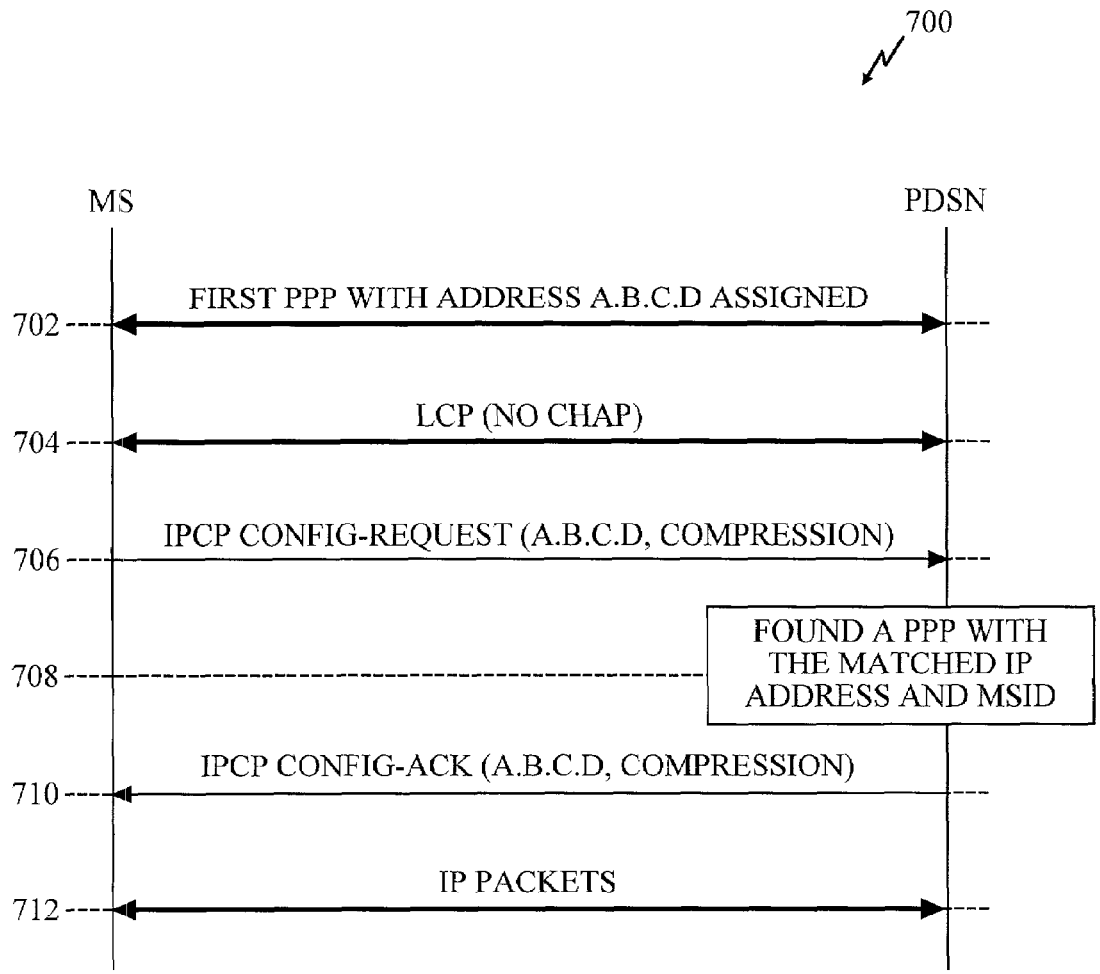
FIG. 7 illustrates the message flow between a Mobile Station and a PDSN for establishing a succeeding PPP connection, with the same IP address as an initial connection, in accordance with an exemplary embodiment.

FIG. 7 illustrates the message flow between a wireless device and a PDSN for establishing a succeeding PPP connection with the same IP address and IP stack as an initial connection, in accordance with an exemplary embodiment. A succeeding connection is a PPP connection made after an initial connection has been established as detailed in FIGS. 3-6. The message flow and method steps for establishing a succeeding PPP connections are identical for both Simple IP and Mobile IP service.

In LCP message exchange 702, an initial PPP session is established as detailed in FIGS. 3-6.

In LCP message exchange 704, the wireless device rejects authentication. For a succeeding request, no authentication is required because the wireless device has already been authenticated, either by Mobile IP, or during the initial PPP request using Simple IP.

The wireless device sends an IPCP Config-Req message 706, to the PDSN requesting a succeeding PPP connection by specifying the known address of the initial connection in the Address Configuration Option and a boolean indication for header compression in the IP COMPRESSION PROTOCL Option. The address of the initial PPP connection is known to the wireless device either as the IP address requested by the wireless device or assigned to the wireless device by the PDSN during LCP negotiation of the initial connection using Simple IP, or as the address generated by the Home Agent and forwarded to the wireless device by the PDSN during the initial connection using Mobile IP Registration.

The PDSN searches 708 for existing PPP connections with a matching IP address and MSID. Finding a matching connection to the initial connection, the PDSN accepts the requested IP address and compression indicator by sending a Config-Ack message 710 to the wireless device specifying the requested address in the IP IP IP Address Configuration Option and the compression indicator in the IP Compression Protocol Option. Since the IP address and MSID associated with this PPP connection match the initial PPP connection, the PDSN concludes that this PPP connection is a multiple PPP event.

IP packet exchange is then allowed 712 between the wireless device and the PDSN. The PDSN differentiates the PPP connection endpoints having the same IP address by using a characteristic of the connection (link), comprising Quality of Service, compression type, RLP transmission delay, guaranteed delivery level, and encryption level. On skilled in the art would understand that the routing of the IP packets could be based on any characteristic of the link other than the shared IP address.

One skilled in the art would understand that ordering of messages illustrated in FIG. 7 is not limiting. The message flow is readily amended by the addition of messages, or the omission or re-ordering of the messages illustrated without departing from the scope of the disclosed embodiments.

Figure 8:
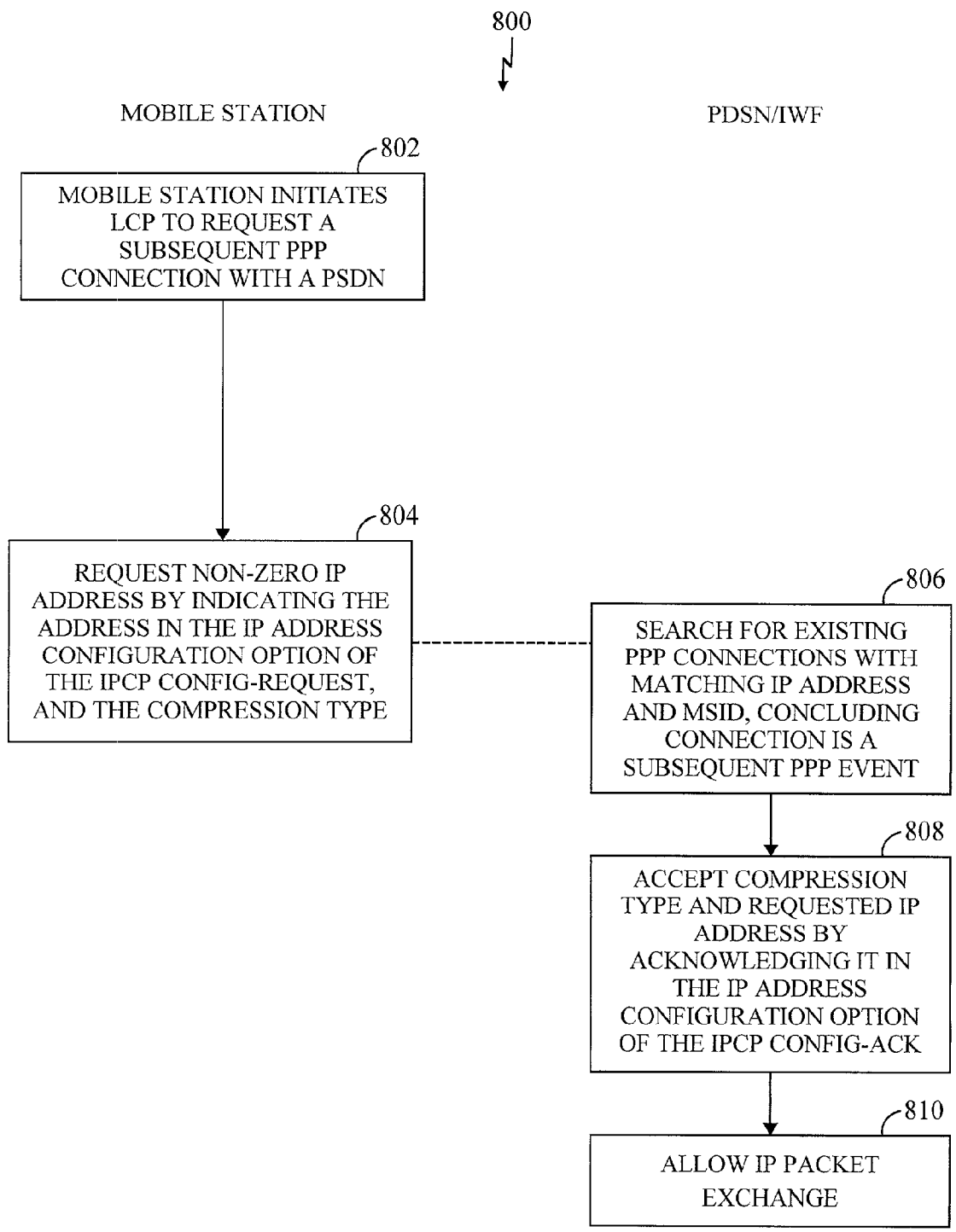
FIG. 8 is a flowchart illustrating steps of establishing a succeeding PPP connection, with the same IP address as an initial connection, between a Mobile Station and a PDSN, in accordance with an exemplary embodiment.

FIG. 8 is a flowchart illustrating steps of establishing a succeeding PPP connection, with the same IP address as an initial connection, between a wireless device and a PDSN, in accordance with an exemplary embodiment.

Beginning with step 802, the wireless device initiates LCP negotiation to request a succeeding PPP connection. Control Flow proceeds to step 804.

In step 804, the wireless device sends an IPCP Config-Req message to the PDSN requesting a succeeding PPP connection by specifying the known address of the initial connection in the IP Address Configuration Option and a boolean indication for header compression in the IP COMPRESSION PROTOCL Option. Control Flow proceeds to step 806.

In step 806, the PDSN searches for existing PPP connections with a matching IP address and MSID, matching the requested IP address and MSID of the requested succeeding connection to the IP address and MSID if the initial connection. Since the IP address and MSID associated with this PPP connection match the initial PPP connection, the PDSN concludes that this PPP connection is a multiple PPP event. Control flow proceeds to step 808.

In step 808, the PDSN sends a Config-Ack message to the wireless device specifying the requested address in the IP Address Configuration Option and the compression indicator in the IP COMPRESSION PROTOCL Option. Control flow proceeds to step 810.

In step 810, IP packet exchange is then allowed between the wireless device and the PDSN. The PDSN differentiates the PPP connection endpoints having the same IP address by using a characteristic of the connection (link), comprising Quality of Service, compression type, RLP transmission delay, guaranteed delivery level, and encryption level. On skilled in the art would understand that the routing of the IP packets could be based on any characteristic of the link other than the shared IP address.

One skilled in the art would understand that ordering of steps illustrated in FIG. 8 is not limiting. The method steps are readily amended by the addition of messages, or the omission or re-ordering of the messages illustrated without departing from the scope of the disclosed embodiments.

Figure 9:
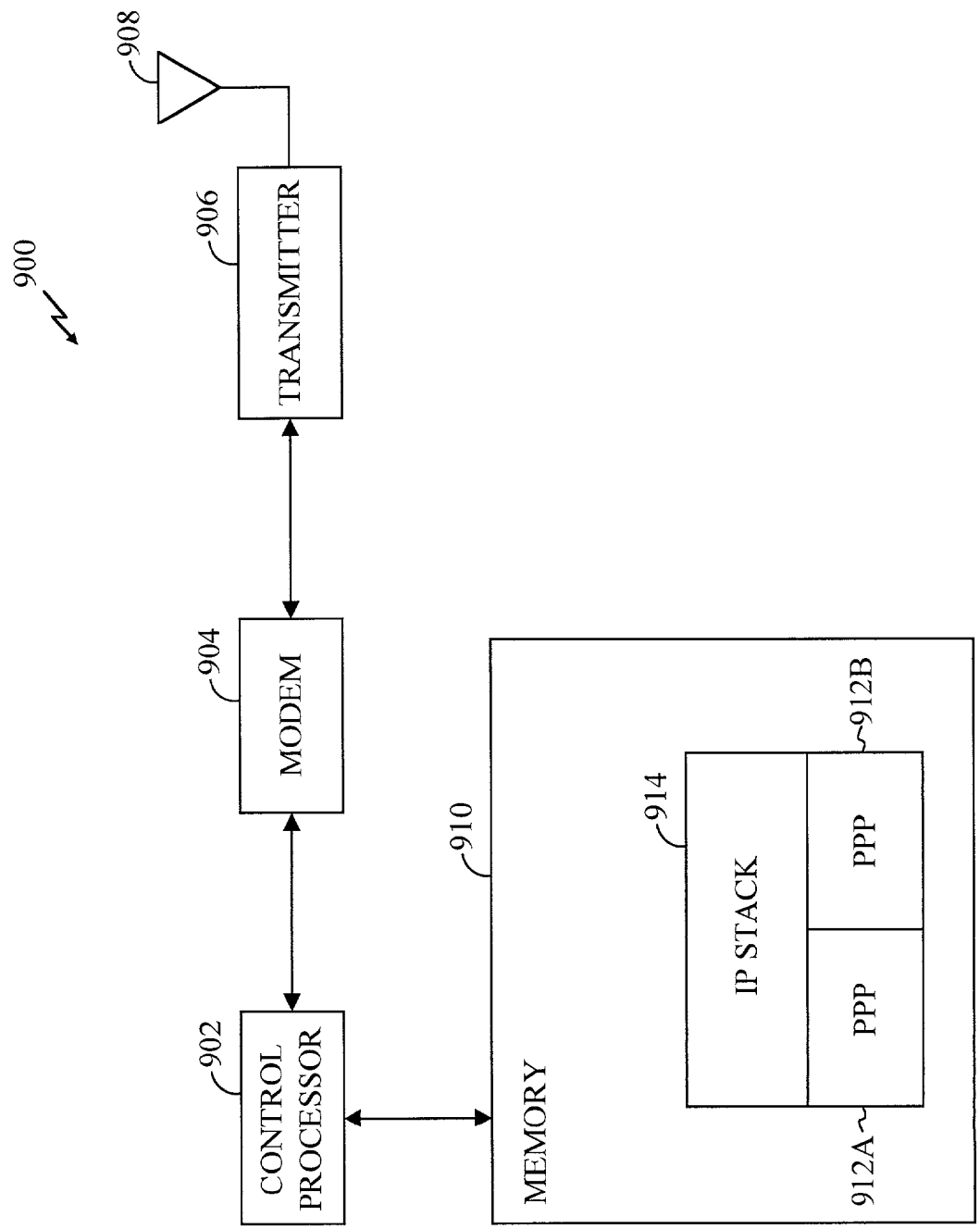
FIG. 9 is a diagram of an exemplary Mobile Station apparatus capable of supporting multiple PPP connections associated with a single IP address in accordance with an exemplary embodiment.

FIG. 9 is a diagram of an exemplary wireless device apparatus 900 capable of supporting multiple PPP connections associated with a single IP address, in accordance with an exemplary embodiment. A control processor 902 establishes a wireless connection through a wireless modem 904, transmitter 906, and antenna 908 as shown. In an exemplary embodiment, the wireless modem 904 and transmitter 906 operate in accordance with the cdma2000 specification. Alternatively, the wireless modem 904 and transmitter 906 could operate in accordance with some other wireless standard such as IS-95, W-CDMA, or EDGE.

The control processor 902 is connected to a memory 910 having code or instructions directing the control processor 902 to establish multiple PPP connections associated with a single IP address as detailed in FIGS. 3-8. The memory 910 may include RAM memory, flash memory, ROM memory, EPROM memory, EEPROM memory, registers, hard disk, a removable disk, a CD-ROM, or any other form of storage medium or computer readable media known in the art.

In an exemplary embodiment, the control processor 902 uses some of the memory 910 as memory buffers (912a and 912b) necessary for operation of first and second PPP connections, where the IP stack 914 is shared by the first and second PPP connections. In the exemplary embodiment, the control processor 902 differentiates the PPP connection endpoints having the same IP address by using a characteristic of the connection (link), comprising Quality of Service, compression type, RLP transmission delay, guaranteed delivery level, and encryption level. On skilled in the art would understand that the control processor 902 may route IP packets based on any characteristic of the link other than the shared IP address.

Figure 10:
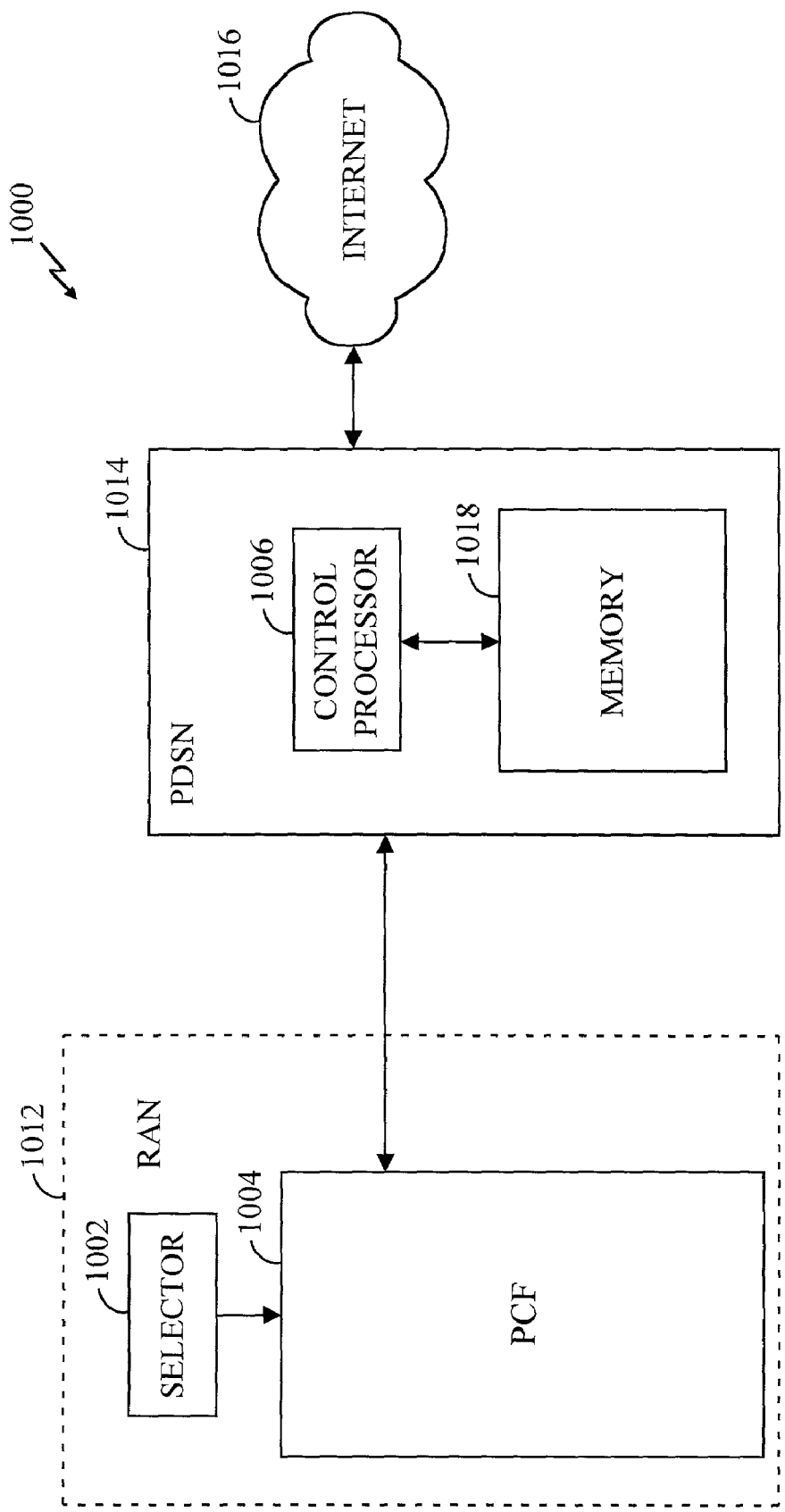
FIG. 10 is a diagram of an exemplary wireless network apparatus capable of differentiating PPP session termination points within a Mobile Station that supports multiple PPP sessions in accordance with an exemplary embodiment.

FIG. 10 is a diagram of an exemplary wireless network apparatus capable of differentiating PPP session termination points within a Mobile Station that supports multiple PPP sessions in accordance with one embodiment. The wireless communication network comprises a RAN 1012 and a PDSN 1014 interface to Network 1016. The RAN 1012 further comprises a selector 1002 that is connected to one or more wireless base stations (not shown). The selector 1002 in the RAN 1012 is generally a subsystem of a base station controller (BSC), which is not shown. All wireless data sent to or received from the wireless device is routed through the selector. In addition to the selector 1002, the RAN 1012 also comprises a Packet Control Function (PCF) 1004. For packet data service options, the selector sends packet data received from the wireless device through the PCF.

PDSN 1014 further comprises a control processor 1006 and memory 1018 containing code or instructions directing the control processor 1006 to establish and differentiate PPP session termination points within a Mobile Station that supports multiple PPP sessions as detailed in FIGS. 3-8. The memory 1018 may include RAM memory, flash memory, ROM memory, EPROM memory, EEPROM memory, registers, hard disk, a removable disk, a CD-ROM, or any other form of storage medium or computer readable media known in the art.

In an exemplary embodiment, in response to an IPCP Config-Req message from a wireless device (not shown) requesting a succeeding PPP connection specifying the known address of an initial connection in the IP Address Configuration Option and a boolean indication for header compression in the IP COMPRESSION PROTOCL Option, the control processor 1006 accesses instructions in memory 1018 to search for existing PPP connections with a matching IP address and MSID. The control processor 1006 accesses instructions in memory 1018 to match the IP address and MSID of the requested succeeding PPP connection to the IP address and MSID if the initial connection. Since the IP address and MSID associated with this PPP connection match the initial PPP connection, the control processor 1006 accesses instructions in memory 1018 to conclude that this PPP connection is a multiple PPP event. The control processor 1006 sends a Config-Ack message to a wireless device (not shown) specifying the requested address in the IP Address Configuration Option and the compression indicator in the IP COMPRESSION PROTOCL Option. The control processor 1006 then allows packet exchange with the wireless device (not shown). The control processor 1006 routes IP packets to different PPP session endpoints within the wireless device having the same IP address based on a characteristic of the connection (link), comprising Quality of Service, compression type, RLP transmission delay, guaranteed delivery level, and encryption level. On skilled in the art would understand that the routing of the IP packets by control processor 1006 could be based on any characteristic of the link other than the shared IP address.

Thus, a novel and improved method and apparatus for differentiating PPP session termination points have been described. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a Mobile Station. In the alternative, the processor and the storage medium may reside as discrete components in a Mobile Station.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system, a method for utilizing a single Internet Protocol address for multiple Point-to-Point Protocol instances between a single wireless device and a wireless network, comprising:
    establishing a first Point-to-Point Protocol link having a first termination endpoint, the first termination endpoint associated with an Internet Protocol Address;
    establishing a second Point-to-Point Protocol link having a second termination endpoint, the second termination endpoint associated with the Internet Protocol Address; and
    differentiating the first termination endpoint and second termination endpoint using a link characteristic, the link characteristic comprising at least one of a compression type, encryption level, Radio Link Protocol transmission delay, or guaranteed delivery level.

2. The method of claim 1 wherein the wireless device uses Simple Internet Protocol service.

3. The method of claim 1 wherein the wireless device uses Mobile Internet Protocol service.

4. In a wireless communication system, a method for providing multiple grades of Radio Link Protocol service to an application of a wireless device, comprising:
    establishing a Point-to-Point Protocol session for each grade of Radio Link Protocol service used by the application to create a set of Point-to-Point Protocol sessions, wherein each Point-to-Point Protocol session of the set of Point-to-Point Protocol sessions comprises a termination endpoint, and wherein the termination endpoint of each Point-to-Point Protocol session is associated with the same Internet Protocol address; and
    differentiating the termination endpoint of each Point-to-Point Protocol session of the set of Point-to-Point Protocol sessions using a session link characteristic, the session link characteristic comprising at least one of a compression type, encryption level, Radio Link Protocol transmission delay, or guaranteed delivery level.

5. The method of claim 4 wherein the wireless device uses Simple Internet Protocol service.

6. The method of claim 4 wherein the wireless device uses Mobile Internet Protocol service.

7. In a wireless communication system, a method for providing at least one grade of Radio Link Protocol service to a first application of a wireless device, and at least one grade of Radio Link Protocol service to at least a second application of the wireless device, comprising:
    establishing at least one Point-to-Point Protocol session for the at least one grade of Radio Link Protocol service used by the first application, and establishing at least one Point-to-Point Protocol session for the at least one grade of Radio Link Protocol service used by the at least second application, wherein each of the Point-to-Point Protocol sessions comprises a termination endpoint, and wherein the termination endpoint of each of the Point-to-Point Protocol sessions is associated with the same Internet Protocol Address; and
    differentiating the termination endpoint of each of the Point-to-Point Protocol sessions using a session link characteristic, the session link characteristic comprising at least one of a compression type, encryption level, Radio Link Protocol transmission delay, or guaranteed delivery level.

8. The method of claim 7 wherein the wireless device uses Simple Internet Protocol service.

9. The method of claim 7 wherein the wireless device uses Mobile Internet Protocol service.

10. A wireless communication system comprising:
    a wireless device for supporting multiple Point-to-Point Protocol sessions, wherein each Point-to-Point Protocol session of the multiple Point-to-Point Protocol sessions comprises a termination endpoint, and wherein the termination endpoint of each Point-to-Point Protocol session is associated with the same Internet Protocol Address and different link characteristic; and
    a wireless network node for exchanging data packets with the wireless device by differentiating the termination endpoint of each Point-to-Point Protocol session of the multiple Point-to-Point Protocol sessions using a session link characteristic, the session link characteristic comprising at least one of a compression type, encryption level, Radio Link Protocol transmission delay, or guaranteed delivery level.

11. The system of claim 10 wherein the wireless network node is a Packet Data Service Node.

12. The system of claim 10 wherein the wireless network node is an Interworking Function.

13. The system of claim 10 wherein the wireless device uses Simple Internet Protocol service.

14. The system of claim 10 wherein the wireless device uses Mobile Internet Protocol service.

15. A wireless device comprising a memory unit coupled to a processing device, the memory unit having stored therein instructions that, if executed by the processing device, will cause the processing device to perform operations supporting multiple Point-to-Point Protocol links, the operations comprising:
    establishing a first Point-to-Point Protocol link having a first termination endpoint, the first termination endpoint associated with an Internet Protocol Address; establishing a second Point-to-Point Protocol link having a second termination endpoint, the second termination endpoint associated with the Internet Protocol Address; and
    differentiating the first termination endpoint and second termination endpoint using a link characteristic, the link characteristic comprising at least one of a compression type, encryption level, Radio Link Protocol transmission delay, or guaranteed delivery level.

16. The wireless device of claim 15 wherein the wireless device uses Simple Internet Protocol service.

17. The wireless device of claim 15 wherein the wireless device uses Mobile Internet Protocol service.

18. A wireless network node comprising a memory unit coupled to a processing device, the memory unit having stored therein instructions that, if executed by the processing device, will cause the processing device to perform operations supporting multiple Point-to-Point Protocol links, the operations comprising:
    establishing a first Point-to-Point Protocol link with a wireless device, the first Point-to-Point Protocol link having a first termination endpoint, the first termination endpoint associated with an Internet Protocol Address;

establishing a second Point-to-Point Protocol link with the wireless device, the second Point-to-Point Protocol link having a second termination endpoint, the second termination endpoint associated with the Internet Protocol Address; and differentiating the first termination endpoint and second termination endpoint using a link characteristic, the link characteristic comprising at least one of a compression type, encryption level, Radio Link Protocol transmission delay, or guaranteed delivery level.

19. The wireless network node of claim 18 wherein the wireless network node is a Packet Data Service Node.

20. The wireless network node of claim 18 wherein the wireless network node is an Interworking Function.

21. The wireless network node of claim 18 wherein the wireless device uses Simple Internet Protocol service.

22. The wireless network node of claim 18 wherein the wireless device uses Mobile Internet Protocol service.

23. A wireless device comprising;
a wireless modem, a transmitter, and an antenna for establishing a wireless connection to a wireless network;
a control processor; and
a memory unit coupled to the control processor, the memory unit having stored therein instructions that, if executed by the control processor, will cause the control processor to perform operations directing the control processor to establish multiple Point-to-Point Protocol sessions, wherein each Point-to-Point Protocol session of the multiple Point-to-Point Protocol sessions comprises a termination endpoint and wherein the termination endpoint of each Point-to-Point Protocol session is associated with the same Internet Protocol address and different link characteristic, and for differentiating the termination endpoint of each Point-to-Point Protocol session of the multiple Point-to-Point Protocol sessions using a session link characteristic, the session link characteristic comprising at least one of a compression type, encryption level, Radio Link Protocol transmission delay, or guaranteed delivery level.

24. The wireless device of claim 23 wherein the wireless device uses Simple Internet Protocol service.

25. The wireless device of claim 23 wherein the wireless device uses Mobile Internet Protocol service.

26. A computer-readable medium having instructions stored thereon to cause computers in a wireless communication system to perform a method for utilizing a single Internet Protocol address for multiple Point-to-Point Protocol instances between a single wireless device and a wireless network, the method comprising:

establishing a first Point-to-Point Protocol link having a first termination endpoint, the first termination endpoint associated with an Internet Protocol Address;

establishing a second Point-to-Point Protocol link having a second termination endpoint, the second termination endpoint associated with the Internet Protocol Address; and differentiating the first termination endpoint and second termination endpoint using a link characteristic, the link characteristic comprising at least one of a compression type, encryption level, Radio Link Protocol transmission delay, or guaranteed delivery level.

27. The computer readable medium of claim 26 wherein the wireless device uses Simple Internet Protocol service.

28. The computer readable medium of claim 26 wherein the wireless device uses Mobile Internet Protocol service.

29. A computer readable medium having instructions stored thereon to cause computers in a wireless communication system to perform a method for providing multiple grades of Radio Link Protocol service to an application of a wireless device, the method comprising:

establishing a Point-to-Point Protocol session for each grade of Radio Link Protocol service used by the application to create a set of Point-to-Point Protocol sessions, wherein each Point-to-Point Protocol session of the set of Point-to-Point Protocol sessions comprises a termination endpoint, and wherein the termination endpoint of each Point-to-Point Protocol session is associated with the same Internet Protocol address; and differentiating the termination endpoint of each Point-to-Point Protocol session of the set of Point-to-Point Protocol sessions using a session link characteristic, the session link characteristic comprising at least one of a compression type, encryption level, Radio Link Protocol transmission delay, or guaranteed delivery level.

30. The computer readable medium of claim 29 wherein the wireless device uses Simple Internet Protocol service.

31. The computer readable medium of claim 29 wherein the wireless device uses Mobile Internet Protocol service.

32. A computer readable medium having instructions stored thereon to cause computers in a wireless communication system to perform a method for providing at least one grade of Radio Link Protocol service to a first application of a wireless device, and at least one grade of Radio Link Protocol service to at least a second application of the wireless device, the method comprising:

establishing at least one Point-to-Point Protocol session for the at least one grade of Radio Link Protocol service used by the first application, and establishing at least one Point-to-Point Protocol session for the at least one grade of Radio Link Protocol service used by the at least second application, wherein each of the Point-to-Point Protocol sessions comprises a termination endpoint, and wherein the termination endpoint of each of the Point-to-Point Protocol sessions is associated with the same Internet Protocol Address; and differentiating the termination endpoint of each of the Point-to-Point Protocol sessions using a session link characteristic, the session link characteristic comprising at least one of a compression type, encryption level, Radio Link Protocol transmission delay, or guaranteed delivery level.

33. The computer readable medium of claim 32 wherein the wireless device uses Simple Internet Protocol service.

34. The computer readable medium of claim 32 wherein the wireless device uses Mobile Internet Protocol service.

35. An apparatus for utilizing a single Internet Protocol Address for multiple Point-to-Point Protocol instances between a single wireless device and a wireless network, comprising:

means for initiating multiple Point-to-Point Protocol links, wherein each Point-to-Point Protocol link of the multiple Point-to-Point Protocol links comprises a termination endpoint, and wherein the termination endpoint of each Point-to-Point Protocol link is associated with the same Internet Protocol Address; and means for differentiating the termination endpoint of each Point-to-Point Protocol link of the multiple Point-to-Point Protocol links using a link characteristic, the link characteristic comprising at least one of a compression type, encryption level, Radio Link Protocol transmission delay, or guaranteed delivery level.

36. In a wireless communication system, an apparatus for utilizing a single Internet Protocol address for multiple Point-to-Point Protocol instances between a single wireless device and a wireless network, comprising:

means for establishing a first Point-to-Point Protocol link having a first termination endpoint, the first termination endpoint associated with an Internet Protocol Address;

means for establishing a second Point-to-Point Protocol link having a second termination endpoint, the second termination endpoint associated with the Internet Protocol Address; and means for differentiating the first termination endpoint and second termination endpoints using a link characteristic, the link characteristic comprising at least one of a compression type, encryption level, Radio Link Protocol transmission delay, or guaranteed delivery level.

37. The apparatus of claim 36 wherein the wireless device uses Simple Internet Protocol service.

38. The apparatus of claim 36 wherein the wireless device uses Mobile Internet Protocol service.

* * * * *